Aug. 21, 1923. Re. 15,680

F. E. SMALL

KITCHEN FORK

Original Filed Dec. 16, 1920

Inventor

Frank E. Small

By his Attorney

Wm. H. Reid.

Reissued Aug. 21, 1923. Re. 15,680

UNITED STATES PATENT OFFICE.

FRANK E. SMALL, OF JAMAICA, NEW YORK.

KITCHEN FORK.

Original No. 1,443,508, dated January 30, 1923, Serial No. 431,156, filed December 16, 1920. Application for reissue filed June 22, 1923. Serial No. 647,129.

*To all whom it may concern:*

Be it known that I, FRANK E. SMALL, a citizen of the United States of America, and resident of Jamaica, Long Island, in the county of Queens and State of New York, have invented new and useful Improvements in Kitchen Forks, of which the following is a specification.

This invention relates to forks and more particularly to a fork for kitchen or culinary purposes and providing means whereby vegetables or other articles of food impaled upon the tines of the fork may readily be ejected therefrom.

While various attempts have heretofore been made to provide forks with ejecting devices, so far as is known no entirely satisfactory device of this kind has as yet come into general use. In many cases the proposed ejector devices have been so complicated and expensive to make, as well as so cumbersome and heavy, as to preclude their employment to any considerable extent for the purpose for which they are designed. One object of the present invention is to provide a fork with an ejector device of light weight and of simple and inexpensive construction, and which at the same time shall be well adapted for its intended use.

As it is quite desirable to guide the ejector member proper by engagement with the fork tines, it is clearly evident that the freedom of movement of such ejector member depends to a large extent upon the degree to which those tines with which it engages approach substantial parallelism, and that the bending of one or more of such tines may render the device entirely inoperative. Such bending of fork tines, particularly the outside tines, where three or more are employed, is of frequent occurrence in culinary use, and a further object of this invention is to so design an ejector device that its freedom of movement will be but little impaired by any ordinary bending of the tines of the fork. To this end it is proposed to form the ejector as a substantially flat plate having a single guide opening therein for engagement with one tine only of the fork. When a three tine fork is employed, this opening may engage the central tine, but if a fork having a different number of tines be employed, the opening in the ejector plate may be arranged to engage such tine as is found to be most convenient in practice. In any event, it is contemplated that the ejector plate will be substantially free from contact with any of the other tines but may if desired extend sufficiently close thereto to insure the ejection of material of substantial size impaled thereon.

In many cases when the provision of an ejector device has been attempted, it has been found necessary to provide a special form of fork, or to make openings in or secure permanent attachments to forks of existing type in order to permit of the proper location of the ejector device. Furthermore with the usual arrangements, it is not easy, if possible to remove the ejector device from the fork, and in many cases this occasions difficulty in cleaning of the fork, with its appurtenance, resulting in an unsanitary condition rendering it undesirable as an implement for use in the preparation of articles of food. A further object of the present invention is to provide an ejector device capable of application to an ordinary type of commercial fork such as is employed for kitchen and culinary use and at the same time to so devise such ejector that it may readily and quickly be removed for cleaning and as easily restored to operative position.

To this end, and as herein disclosed, the ejector device when applied to a three tine, loop-handled wire fork, may comprise an ejector plate as aforesaid having an opening slidably engaging the central tine of the fork, an actuating member having guide notches into engagement with which the spaced bars of the fork handle may be sprung, and suitable means for connecting the ejector plate and actuating member.

While the device has been illustrated as applied to a specific type of fork, it is clearly evident that it might be adapted by slight modifications in shape or relative proportion of parts for application to other known forms of fork, and although the ejector proper has been illustrated as comprising a substantially flat plate it is contemplated that ejector elements of other and equivalent form might well be substituted for that herein specifically shown:

A preferred form of device is illustrated in the accompanying drawings in which—

Figure 1:
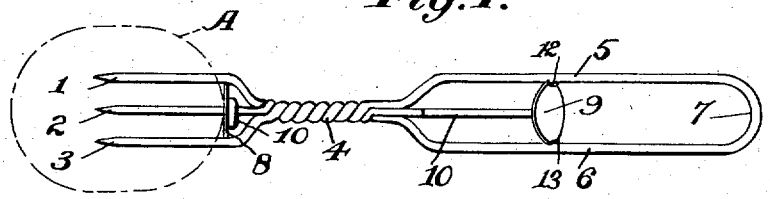
Fig. 1 is a plan view of the fork illustrating the same in position for use with the ejector member in inoperative position.
Figure 2:
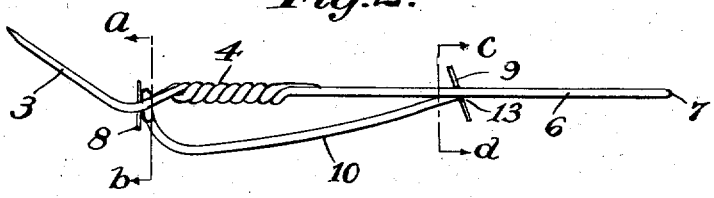
Fig. 2 is a side elevation of the fork with the parts arranged as in Fig. 1.

As therein illustrated, the fork comprises three tines 1, 2, 3, respectively, which may be formed of wire if desired and which are herein indicated as twisted together at 4. The handle of the fork comprises a loop-like open frame consisting of the side bars 5, 6 arranged substantially parallel and spaced apart one from the other, such bars being integrally united if desired to form the closed end 7, and may be twisted at 4 with the tine members of the fork. If desired, two of the tine members and the handle member may be formed of a continuous piece forming the third tine member. The exact mode of construction of the fork however, is immaterial in so far as the fundamental features of the present invention are concerned.

8 is an ejector member and 9 is an actuator thereof, said members being suitably connected by means of a substantially rigid rod or wire 10. The members 8 and 9 may be secured to the ends of the rod 10 in any suitable manner, as by soldering or brazing. It is contemplated however, as within the scope of the invention that the members 8 and 9 might be formed integral with the bar of wire 10, as for example by casting the same as a unitary structure, or by forming the members 8 and 9 by suitably twisting and bending the piece of wire forming the rod 10.

Figure 4:
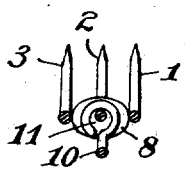
Fig. 4 is a cross section of the device on the line *a—b* of Fig. 2.

Regardless of the mode of manufacture of the ejector device it is preferred to form the plate 8 substantially as indicated in Fig. 4, wherein the ejector proper is shown as comprising a relatively thin plate of substantially elliptical form. This plate is provided adjacent its center with an opening 11, whereby the plate may be guided for free sliding movement along the member 2.

The plate is preferably so arranged that its major axis lies substantially in the plane of the tines of the fork, but is of such dimension that while substantially filling the space between the central tine and the outer tines, it does not actually engage the outer tines. The actuator member 9 is also of substantially elliptical form and is provided with open ended notches 12, 13 at the ends of its major axis. These notches are arranged for slidable engagement with the bars 5 and 6 respectively of the handle.

Figure 3:
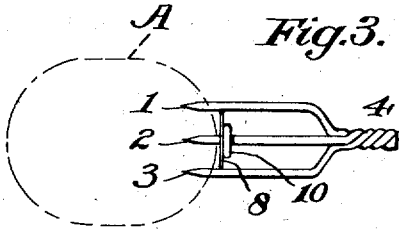
Fig. 3 is a fragmentary view of the left hand portion of the device shown in Fig. 1, but indicating the ejector device as having been moved to eject material impaled on the tines of the fork.
Figure 5:
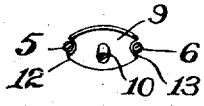
Fig. 5 is a cross section on the line *c—d* of Fig. 2.
Figure 6:
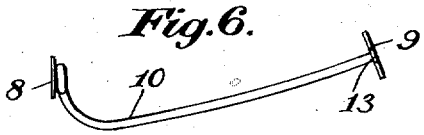
Fig. 6 is a side elevation of the ejector device removed from the fork.

In the assembling the fork and ejector device, it is merely necessary to slip the plate 8 over the central tine 2 and move the same backward until the actuator plate 9 occupies a position adjacent the center or length of the handle. When in this position the bars 5, 6, may readily be sprung apart sufficiently to permit the plate 9 to be snapped between the same whereby to permit the bars 5, 6 to loosely engage with in the notches 12, 13. When thus arranged, the device is ready for use, and as indicated in Fig. 1 the ejector plate 8 may be retracted by the thumb or finger of the user, thus permitting an article of food, as for example, a potato, indicated at A in the drawing, to be impaled on the tines of the fork. For removing such article from the fork tines, the operator by pushing upon the actuator plate 9 may cause the ejector plate 8 to slide along the tine 2 until it occupies a position such as shown in Fig. 3, in which position the potato or other article of food will be discharged from the fork tines.

For cleaning the fork the ejector device may be removed therefrom by springing apart the bars 5, 6, of the fork handle.

It will thus be understood that I provided an improved fork comprising essentially two novel features, the ejector member guided by the central tine and independent of the other tines, also the detachable connection of the ejector member with the handle. These two combine to make a very efficient article, but they could be used independently, and the ejector handle feature can be changed without affecting the arrangement of the ejector by engaging the tine. In other words the handle connection can be permanent yet the ejector member would operate in substantially the same manner.

What I claim is:—

1. An ejector device for kitchen forks having a series of tines, comprising an ejector plate having a central opening at which it is slideable along the middle tine, said plate extending to the outer tines but without operatively engaging the latter, and a finger engageable member guided by the fork handle.

2. An ejector device for a fork having a series of tines, said device comprising an ejector member having a sliding engagement with the middle tine only, and extending to the outer tines without having a guiding engagement with the latter.

3. A detachable ejector device for use with a fork having a handle comprising substantially parallel spaced resilient members, said device comprising an ejector member slidably associated with the fork tines, an actuated member having notched portions slidably and removably engaging with the respective spaced members of the handle, and means for connecting said ejector member and said actuating member.

4. In a detachable ejector device for use with wire handled forks having handles comprising spaced substantially parallel bars, an ejector member slidably engageable with a fork tine, an actuator therefor comprising a substantially elliptical plate having notches at the opposite ends of its major axis for engagement with the respective bars of the handle, and a rod having its opposite ends secured to said ejector and actuator respectively.

5. A detachable ejector device for use with wire handled forks having handles comprising substantially parallel spaced members, said device comprising an ejector plate having an opening for receiving one of the fork tines, an actuator member constructed and arranged for engagement with said parallel members of the handle by springing them laterally, and a bar connecting said plate and actuator member.

6. In combination with an ejector member arranged for association with the tines of a fork having a handle comprising a pair of substantially parallel spaced bars, an actuator plate of substantially elliptical form having open ended notches at the opposite ends of one of its axes said notches being constructed and arranged to be slidably engaged with the respective parallel bars by springing the latter apart and into engagement with said notches.

7. A detachable ejector device for use with a fork provided with a relatively straight handle having parallelly spaced elements and having three curved tines, comprising an actuator member slidably guided for movement between the elements of said handle, an ejector member guided for sliding movement along the central one of said curved tines, and a rigid connecting rod for transmitting movement from said actuator to said ejector member, said actuator and ejector members being constructed and arranged for ready application to or removal from the fork.

Signed at New York, N. Y., this ——— day of June 1923.

FRANK E. SMALL.